(12) United States Patent
Poplin

(10) Patent No.: US 7,333,145 B2
(45) Date of Patent: Feb. 19, 2008

(54) CAMERA MODULE

(75) Inventor: Dwight D. Poplin, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 883 days.

(21) Appl. No.: 10/794,961

(22) Filed: Mar. 5, 2004

(65) Prior Publication Data

US 2005/0195319 A1    Sep. 8, 2005

(51) Int. Cl.
*H04N 5/222* (2006.01)
*G03B 13/00* (2006.01)
*G03B 13/02* (2006.01)

(52) U.S. Cl. .................. 348/371; 396/106; 348/229.1; 348/364

(58) Field of Classification Search ................ 348/370, 348/371, 375; 396/176, 177, 178, 106
See application file for complete search history.

(56) References Cited

U.S. PATENT DOCUMENTS

| | | | |
|---|---|---|---|
| 5,860,029 A | 1/1999 | Ichikawa et al. | |
| 6,100,928 A | 8/2000 | Hata | |
| 6,191,818 B1* | 2/2001 | Koizumi | 348/333.01 |
| 6,426,775 B1 | 7/2002 | Kurokawa | |
| 6,441,856 B1 | 8/2002 | Sugimoto | |
| 6,546,116 B2 | 4/2003 | Brunk et al. | |
| 6,564,014 B1* | 5/2003 | Takeuchi et al. | 396/157 |
| 6,570,620 B1 | 5/2003 | Yoshimura et al. | |
| 6,573,932 B1 | 6/2003 | Adams, Jr. et al. | |
| 6,654,062 B1 | 11/2003 | Numata et al. | |
| 6,661,460 B1 | 12/2003 | Higuchi | |

\* cited by examiner

*Primary Examiner*—Ngoc-Yen Vu
*Assistant Examiner*—Adam L Henderson
(74) *Attorney, Agent, or Firm*—RatnerPrestia

(57) ABSTRACT

A camera module comprising an image sensor array, a gain amplifier, an indicator set to indicate whether a first flash device or a second flash device is present, and a plurality of storage locations. The plurality of storage locations is configured to store an exposure time and a gain. The exposure time and the gain are associated with the first flash device in response to the indicator indicating the presence of the first flash device, and the exposure time and the gain are associated with the second flash device in response to the indicator indicating the presence of the second flash device. The image sensor array is configured to capture an image using the exposure time, and the gain amplifier is configured to perform processing on the image using the gain.

29 Claims, 9 Drawing Sheets

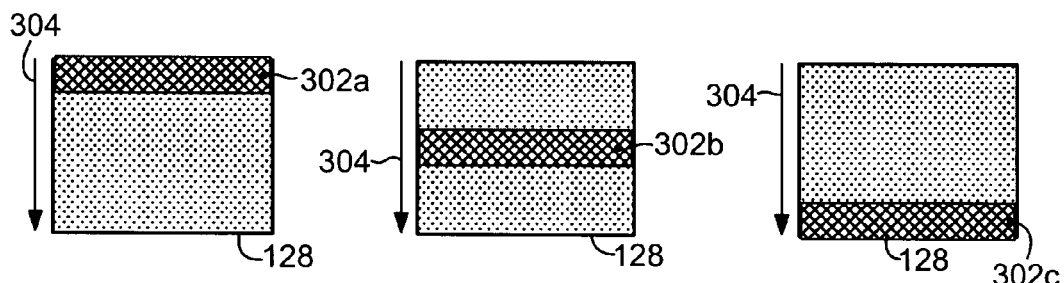
Fig. 2
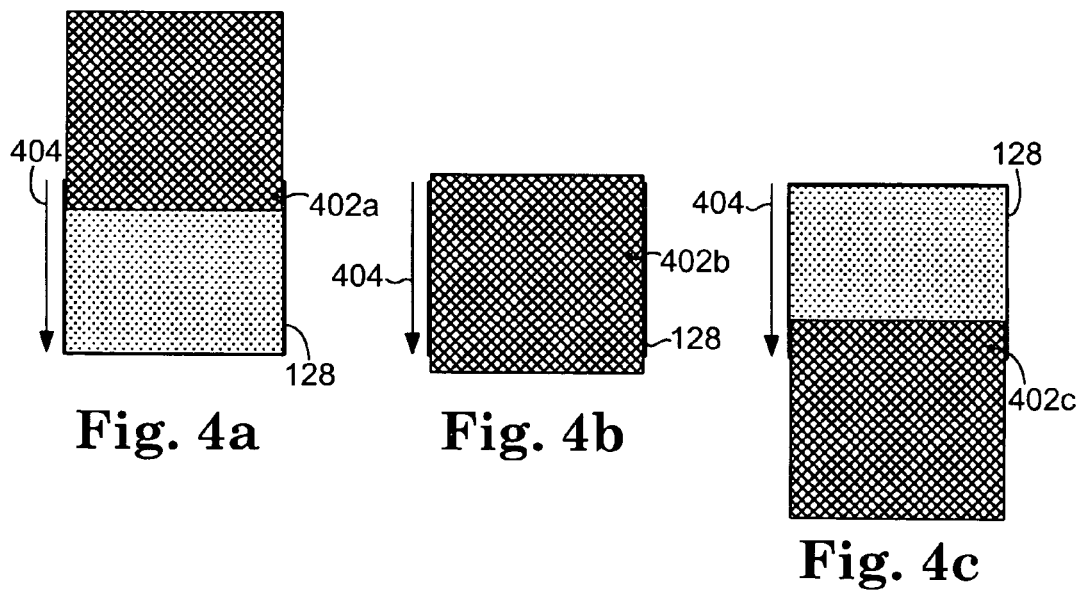
Fig. 3a   Fig. 3b   Fig. 3c
Fig. 4a   Fig. 4b   Fig. 4c

CAMERA MODULE

BACKGROUND

Some portable electronic devices, such as mobile telephones, include image capture capabilities similar to those associated with a digital camera. These devices, however, may be smaller and/or more compact than many digital cameras, and as a result, do not have the space that is needed to accommodate all of the components of a conventional standalone digital camera. Accordingly, certain features that may be common in digital cameras may be difficult to include in portable electronic devices. In addition, portable electronic devices that include image capture capabilities may be offered at prices less than those associated with digital cameras. As a result, certain features that may be common in digital cameras may be omitted from portable electronic devices to allow desired price targets of the electronic devices to be met.

It would be desirable to be able to provide additional image capture features in portable electronic devices while minimizing the size and cost associated with the features.

SUMMARY

In an exemplary embodiment, the present disclosure provides a camera module comprising an image sensor array, a gain amplifier, an indicator set to indicate whether a first flash device or a second flash device is present, and a plurality of storage locations. The plurality of storage locations is configured to store an exposure time and a gain. The exposure time and the gain are associated with the first flash device in response to the indicator indicating the presence of the first flash device, and the exposure time and the gain are associated with the second flash device in response to the indicator indicating the presence of the second flash device. The image sensor array is configured to capture an image using the exposure time, and the gain amplifier is configured to perform processing on the image using the gain.

BRIEF DESCRIPTION OF THE DRAWINGS

FIG. 2 is a diagram illustrating an embodiment of a set of registers.

FIGS. 3a, 3b, and 3c are diagrams illustrating an embodiment of operating an image sensor array using a first exposure time.

FIGS. 4a, 4b, and 4c are diagrams illustrating an embodiment of operating an image sensor array using a second exposure time.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
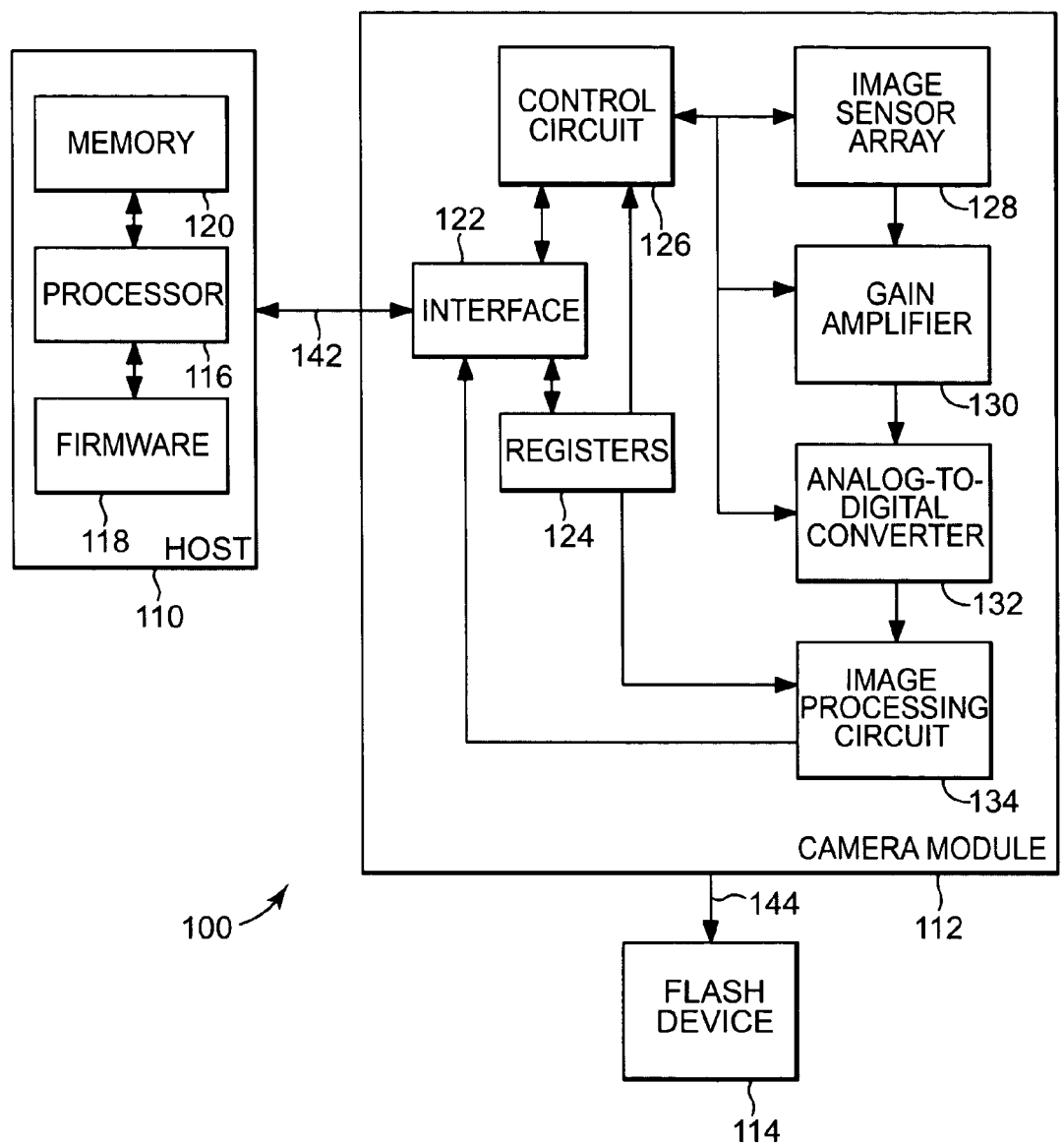
FIG. 1 is a block diagram illustrating an embodiment of a system that comprises a camera module.

FIG. 1 is a block diagram illustrating an embodiment of a system 100 that comprises a camera module 112. System 100 comprises a host 110 and a flash device 114 coupled to camera module 112. Host 110 comprises a processor 116, firmware 118, and a memory 120. Camera module 112 comprises an interface 122, a set of registers 124, a control circuit 126, an image sensor array 128, a gain amplifier 130, an analog-to digital converter (ADC) 132, and an image processing circuit 134.

Host 110 is configured to operate camera module 112 in a viewfinder mode and a snapshot mode by communicating with camera module 112 using a connection 142. In one embodiment, connection 142 comprises an I2C bus and other signals. In other embodiments, connection 142 may comprise other types of busses or signals. In the viewfinder mode of operation, host 110 causes camera module 112 to continuously capture images and provide those images to host 110 using connection 142. In the snapshot mode of operation, host 110 causes camera module 112 to capture a single image and provide that image to host 110 using connection 142 in response to a snapshot signal from host 110. Host 110 may cause camera module 112 to provide a flash signal to flash device 114 to generate a flash according to environmental light conditions in snapshot mode. Host 110 provides parameters to camera module 112 in viewfinder mode and snapshot mode to determine how camera module 112 captures images as will be described in additional detail below.

In the embodiment of FIG. 1, processor 116 executes firmware 118 to allow host 110 to operate camera module 112. Firmware 118 comprises instructions configured to cause functions to be performed in response to being executed by processor 116. These functions include accessing information from camera module 112, generating signals and parameters, and providing signals and parameters to camera module 112. Memory 120 stores images received by host 110 from camera module 112.

Camera module 112 captures images in either viewfinder mode or snapshot mode in response to signals from host 110. Host 110 provides the signals to camera module 112 using interface 122 and stores parameters in registers 124. As shown in FIG. 2, registers 124 comprise registers 200 through 216. Register 200 is configured to store a flash enable/flash type indicator. The flash enable/flash type indicator indicates whether or not a flash device 114 is present and enabled and, if present, the type of flash device, e.g. an LED flash device or a xenon flash device. Register 202 is configured to store a flash time. The flash time may be used by camera module 128 as the amount of time to turn on flash device 114. Register 204 is configured to store an exposure time. The exposure time is used by control circuit 126 to control how long an image is exposed in image sensor array 128. Register 206 is configured to store a gain. The gain is provided to gain amplifier 130 to control the amount of gain that is applied to image data by gain amplifier 130. Register 208 is configured to store a flash exposure-gain-product (EGP). Register 210 is configured to store a flash EGP threshold. The flash EGP threshold may be used by host 110 to determine whether or not to cause a flash to be generated by flash device 114 while capturing an image. Register 212 is configured to store a flash maximum time. The flash maximum time indicates the maximum amount of time that a flash may be used during an image exposure. Register 214 is configured to store a flash red coefficient. The flash red coefficient is provided to image processing circuit 134 to adjust the white balance of an image when a flash is used during image exposure. Register 216 is configured to store a flash blue coefficient. The flash blue coefficient is provided to image processing circuit 134 to adjust the white balance of an image when a flash is used during image exposure.

In response to the signals and parameters from host 110, control circuit 126 operates camera module 112 in viewfinder mode (continuous images) or snapshot mode (single image with or without flash). To capture an image in either mode, control circuit 126 provides signals to image sensor array 128 to cause an image to be captured according to one or more parameters provided by host 110. The parameters include an exposure time from register 204 and a gain from register 212 as will be described in additional detail below.

Image sensor array 128 comprises an array of photo diodes and associated optics for focusing an image onto the array. The array is arranged in rows and columns of photo diodes. Each photo diode discharges a capacitor in response to the amount of light that is exposed on the photo diode. To capture an image, control circuit 126 causes the capacitors to be reset by charging the capacitors to a supply voltage. The photo diodes are then exposed to a light source on a row-by-row basis for the amount of time associated with the exposure time in register 204 to cause the capacitors to discharge in response to the amount of light from the light source. After the time period elapses, control circuit 126 causes the capacitors in a row to be sampled to capture the image data from that row. Image sensor array 128 provides the image data for each row to gain amplifier 130.

Gain amplifier 130 comprises a programmable gain amplifier. Gain amplifier 130 receives the image data from image sensor array 128 and amplifies the image data using the gain provided from register 206 by control circuit 126. Gain amplifier 130 provides the amplified image data to ADC 132.

ADC 132 receives the amplified image data from gain amplifier 130. ADC 132 converts the amplified image data from an analog form to a digital form and provides the digital image data to image processing circuit 134.

Image processing circuit 134 receives the digital image data from ADC 132 and performs various processing functions on the digital image data to generate an image that is displayable on a display. The processing functions may include an auto white balance function where the red and blue portions of the image may be adjusted using the flash red coefficient from register 214 and the flash blue coefficient from register 216 to compensate for the color temperature of the light illuminating the image. Image processing circuit 134 provides the image to host 110 using interface 122. Host 110 causes the image to be stored in memory 120. Host 110 may cause the image to be displayed on a display (not shown) integrated with the host or transmitted to another electronic device using a wired or wireless connection (not shown).

In the embodiment of FIG. 1, flash device 114 comprises either an LED flash device or a xenon flash device. In other embodiments, flash device 114 may comprise other types of flash devices. Flash device 114 is operable in response to a flash signal from camera module 112 on connection 144. The flash signal may vary in duration according to the type of flash device 114 as will be described with respect to FIGS. 6 and 8 below. Control circuit 126 generates the flash signal and provides the flash signal to flash device 114 in response to a snapshot signal from host 110.

FIGS. 3a, 3b, and 3c illustrate additional details of the operation of image sensor array 128 using a first exposure time. In the embodiment shown in FIGS. 3a through 3c, image sensor array 128 is operated as a rolling shutter such that the rows of image sensor array 128 are exposed sequentially starting at the top of the array and proceeding downward as indicated by the direction of an arrow 304. A shaded box 302a in FIG. 3a illustrates a first set of rows of image sensor array 128 being exposed at a first time. At a second, subsequent time, the first set of rows has finished being exposed, and a second set of rows is being exposed as illustrated by a shaded box 302b in FIG. 3b. Finally, at a third time subsequent to the second time, the first and second sets of rows have finished being exposed, and a third set of rows of image sensor array 128 is being exposed as illustrated by a shaded box 302c in FIG. 3c. As shown by the example in FIGS. 3a through 3c, different rows may be exposed at different times in response to a relatively short exposure time.

FIGS. 4a, 4b, and 4c illustrate additional details of the operation of image sensor array 128 using a second exposure time that is longer in duration than the first exposure time illustrated in FIGS. 3a through 3c. As with FIGS. 3a through 3c, image sensor array 128 is operated as a rolling shutter such that the rows of image sensor array 128 are exposed sequentially starting at the top of the array and proceeding downward as indicated by the direction of an arrow 404. A shaded box 402a in FIG. 4a illustrates a first portion of the rows of image sensor array 128 being exposed at a first time. At a second, subsequent time, all of the rows in image sensor array 128 are being exposed simultaneously as illustrated by a shaded box 402b in FIG. 4b. Finally, at a third time subsequent to the second time, the last rows of image sensor array 128 being exposed as illustrated by a shaded box 402c in FIG. 4c. As shown by the example in FIGS. 4a through 4c, all rows in image sensor array 128 may be exposed simultaneously in response to a relatively long exposure time.

The frame time of image sensor array 128 is the amount of time it takes to begin exposing all rows in image sensor array 128. In FIGS. 3a through 3c, the exposure time is less than the frame time as evidenced by the exposure of the first and second sets of rows completing prior to exposing the third set of rows. In FIGS. 4a through 4c, however, the exposure time is greater than the frame time as evidenced by all rows being exposed simultaneously as shown in FIG. 4b.

In the viewfinder mode of operation and in the snapshot mode of operation where a flash is not used, image sensor array 128 may be operated with an exposure time that is greater than, less than, or equal to the frame time of image sensor array 128. In the snapshot mode of operation where a flash is used and image sensor array 128 operates as a rolling shutter, however, image sensor array 128 is operated with an exposure time that is greater than the frame time of image sensor array 128 to ensure that all rows of image sensor array 128 received the flash from flash device 114.

When a flash is used in snapshot mode, host 110 calculates parameters such as flash time, exposure time, gain, and white balance coefficients to compensate for the increased light that the flash adds to an image. As described in FIGS. 5-10 below, host 110 calculates these parameters differently depending on the type of flash device and the operation of image sensor array 128. Accordingly, the parameters are associated with the type of flash device and the operation of image sensor array 128.

Figure 5:
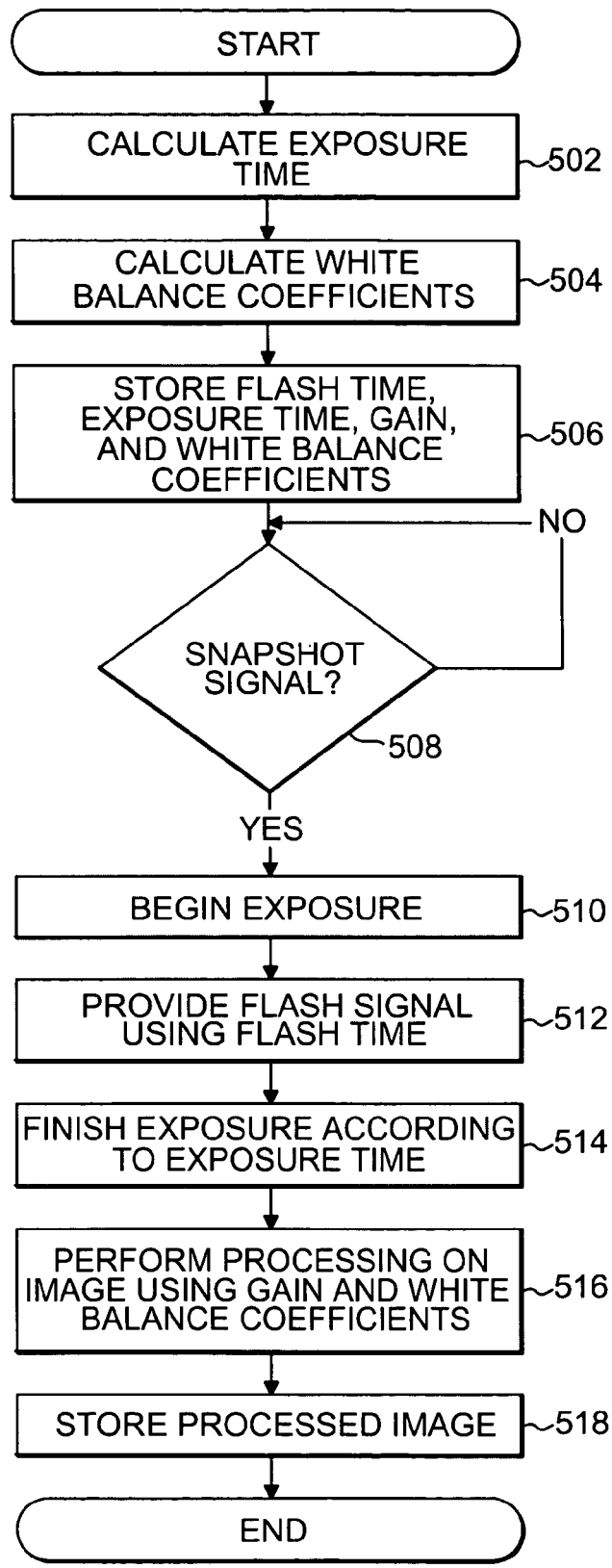
FIG. 5 is a flow chart illustrating a first embodiment of a method for capturing an image in a snapshot mode of operation.
Figure 6:
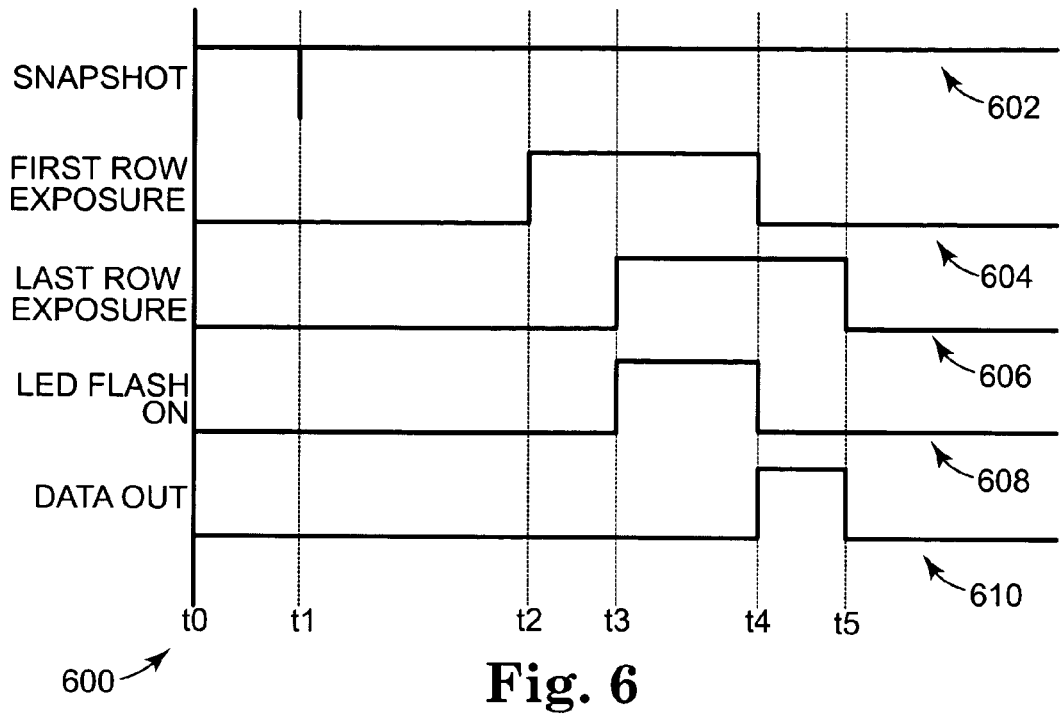
FIG. 6 is a timing diagram illustrating a first example of signals used to capture an image in a snapshot mode of operation.

FIGS. 5 and 6 illustrate an embodiment of system 100 in the snapshot mode of operation where flash device 114 is an LED flash device and image sensor array 128 operates as a rolling shutter. FIG. 5 is a flow chart illustrating a first embodiment of a method for capturing an image in a snapshot mode of operation. FIG. 6 is a timing diagram 600 illustrating a first example of signals used to capture an image in a snapshot mode of operation.

In the snapshot mode, host 110 determines whether a flash is desired by analyzing the one or more images received from camera module 112 during viewfinder mode. In response to determining that a flash is desired, host 110 accesses the flash enable/flash type register 200 to enable flash device 114. Host 110 also detects that the flash type of flash device 114 is an LED flash device. Camera module 112 provides a flash signal to the LED flash device to cause the flash to be activated or turned on for the amount of time specified by the flash time in register 202. Host 110 calculates the flash time and stores it in register 202 as described below.

Referring to FIG. 5, host 110 calculates exposure time for the snapshot as indicated by a block 502. To calculate exposure time, host 110 calculates M—the ratio of flash illumination, $I_F$, to viewfinder illumination, $I_V$. Host 110 calculates M using the viewfinder exposure-gain product, $EGP_V$, and the flash exposure-gain product, $EGP_F$. To maintain proper exposure, the product of EGP and I are a constant. Therefore, the product of $EGP_V$ and $I_V$ is equal to the product of $EGP_F$ and $I_F$ as shown in equation [1].

$$EGP_V \cdot I_V = EGP_F \cdot I_F \quad [1]$$

Using equation [1], M can be calculated from $EGP_V$ and $EGP_F$ as shown in equation [2].

$$M = \frac{I_F}{I_V} = \frac{EGP_V}{EGP_F} \quad [2]$$

An auto exposure function in host 110 (not shown) measures $EGP_V$ during viewfinder mode. $EGP_F$ is programmed into register 206 by a user of system 100 and accessed by host 110. Accordingly, host 110 calculates M using these values in equation [2].

The exposure time in snapshot mode, $E_S$, with an LED flash device is the sum of the FrameTime, i.e., the amount of time it takes to begin exposing all rows in image sensor array 128, and the FlashTime, i.e., the amount of time that the LED flash device is on, as shown in equation [3].

$$E_S = \text{FlashTime} + \text{FrameTime} \quad [3]$$

FrameTime is programmed into host 110 by a user of system 100. FlashTime is deduced from equation [4] as follows.

$$E_V \cdot G_V \cdot I_V = \text{FlashTime} \cdot G_S \cdot I_F + (\text{FlashTime} + \text{FrameTime}) \cdot G_S \cdot I_V \quad [4]$$

In equation [4], the exposure-gain product times the illumination in viewfinder mode is equal to the sum of the product of FlashTime, the snapshot gain, $G_S$, and the flash illumination, $I_F$, and the product of the snapshot exposure time, $E_S$, (with FlashTime+FrameTime substituted for $E_S$ in equation [4] using equation [3]), the snapshot gain, $G_S$, and the viewfinder illumination. On the right side of the equation, the first product (FlashTime, $G_S$, and $I_F$) represents the amount of light added by flash device 114 and the second product ($E_S$, $G_S$, and $I_V$) represents the amount of light present in viewfinder mode.

As shown in equation [5], the flash illumination, $I_F$, is replaced with M and the viewfinder illumination, $I_V$, using equation [2].

$$E_V \cdot G_V \cdot I_V = \text{FlashTime} \cdot G_S \cdot M \cdot I_V + (\text{FlashTime} + \text{FrameTime}) \cdot G_S \cdot I_V \quad [5]$$

The viewfinder illumination, $I_V$, values cancel on each side of equation [5] to give equation [6].

$$E_V \cdot G_V = \text{FlashTime} \cdot G_S \cdot M + (\text{FlashTime} + \text{FrameTime}) \cdot G_S \quad [6]$$

The snapshot gain, $G_S$, is moved from the right side of equation [6] to give equation [7].

$$E_V \cdot \frac{G_V}{G_S} = \text{FlashTime} \cdot (1 + M) + \text{FrameTime} \quad [7]$$

FlashTime can then be solved for as shown in equation [8].

$$\text{FlashTime} = \frac{E_V \cdot \frac{G_V}{G_S} - \text{FrameTime}}{1 + M} \quad [8]$$

As noted above, an auto exposure function in host 110 measures $EGP_V$, i.e., $E_V \cdot G_V$, during viewfinder mode. Host calculates M using equation [2] above. FrameTime is programmed by a user of system 100, and host 110 calculates the snapshot gain, $G_S$. Accordingly, host 110 calculates FlashTime using equation [8].

Host 110 also calculates white balance coefficients as indicated by a block 504. Host 110 calculates the white balance coefficients by interpolating between the white balance coefficients for viewfinder mode and for flash device 114. In particular, host 110 calculates a red coefficient, $RED_S$, and a blue coefficient, $BLUE_S$, using M from equation [2] and red and blue coefficients for viewfinder mode, $RED_V$ and $BLUE_V$, respectively, and for flash device 114, $RED_F$ and $BLUE_F$, respectively, as indicated in equations [9] and [10], respectively.

$$RED_S = \left(RED_V \cdot \frac{1}{1+M}\right) + \left(RED_F \cdot \frac{M}{1+M}\right) \quad [9]$$

$$BLUE_S = \left(BLUE_V \cdot \frac{1}{1+M}\right) + \left(BLUE_F \cdot \frac{M}{1+M}\right) \quad [10]$$

The flash time, exposure time, gain, and white balance coefficients are stored in registers 124 by host 110 as indicated by a block 506. A determination is made as to whether a snapshot signal has been received from host 110 by camera module 112 as indicated by a block 508. If a snapshot signal has not been received, then the determination of block 508 is made again at a later time. If a snapshot signal has been received, then an exposure is begun to capture an image using image sensor array 128 as indicated by a block 510. A flash signal is provided to flash device 114 to cause the LED flash to be turned on as indicated by a block 512. The exposure is finished according to the exposure time as indicated by a block 514. Processing is performed on the image by gain amplifier 130 and image processing circuit 134 using the gain and the white balance coefficients, respectively, as indicated by a block 516. The processed image is stored in memory 120 on host 110 as indicated by a block 518.

FIG. 6 illustrates the operation of snapshot mode with an LED flash device. Timing diagram 600 illustrates a snapshot signal 602, a first row exposure signal 604, a last row exposure signal 606, an LED flash device on signal 608, and a data out signal 610.

At a time t1, host 110 provides a snapshot signal to camera module 112. At a time t2, the first row of image sensor array 128 begins exposing, and at time t3, the last row of image sensor array 128 begins exposing. Thus, the FrameTime, in FIG. 6, is the amount of time between t2 and t3. The LED flash is turned on at time t3 in response to a flash signal from camera module 112 and remains on until time t4 when the first row of image sensor array 128 finishes exposing. The duration of the flash signal is determined using the flash time in register 202. At time t4, data output from image sensor array 128 to gain amplifier 130 begins and continues until time t5 when the last row of image sensor array 128 finishes exposing.

Figure 8:
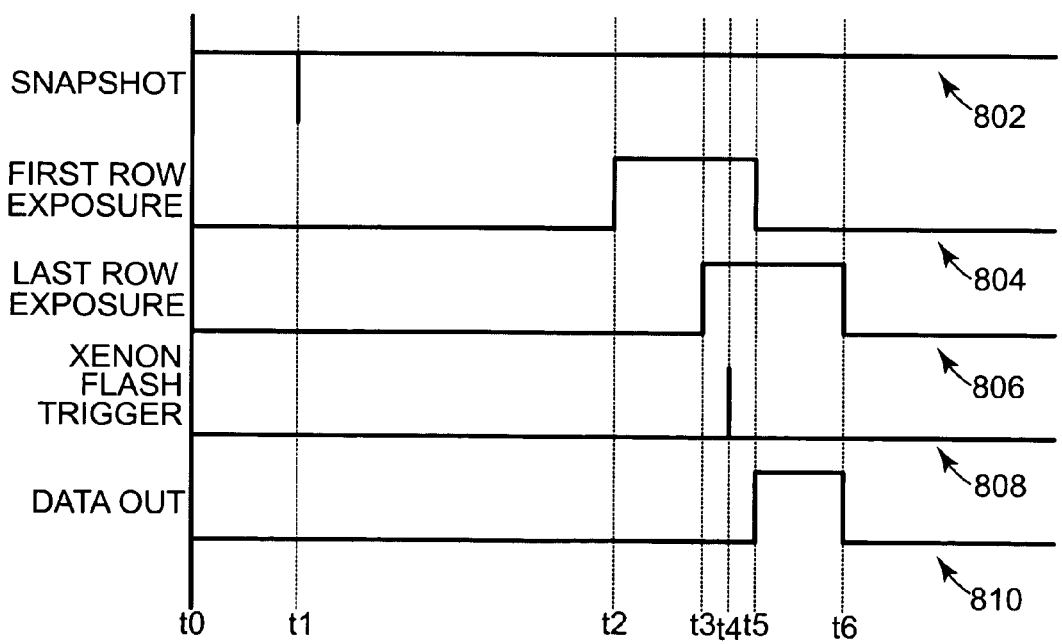
FIG. 8 is a timing diagram illustrating a second example of signals used to capture an image in a snapshot mode of operation.
Figure 7:
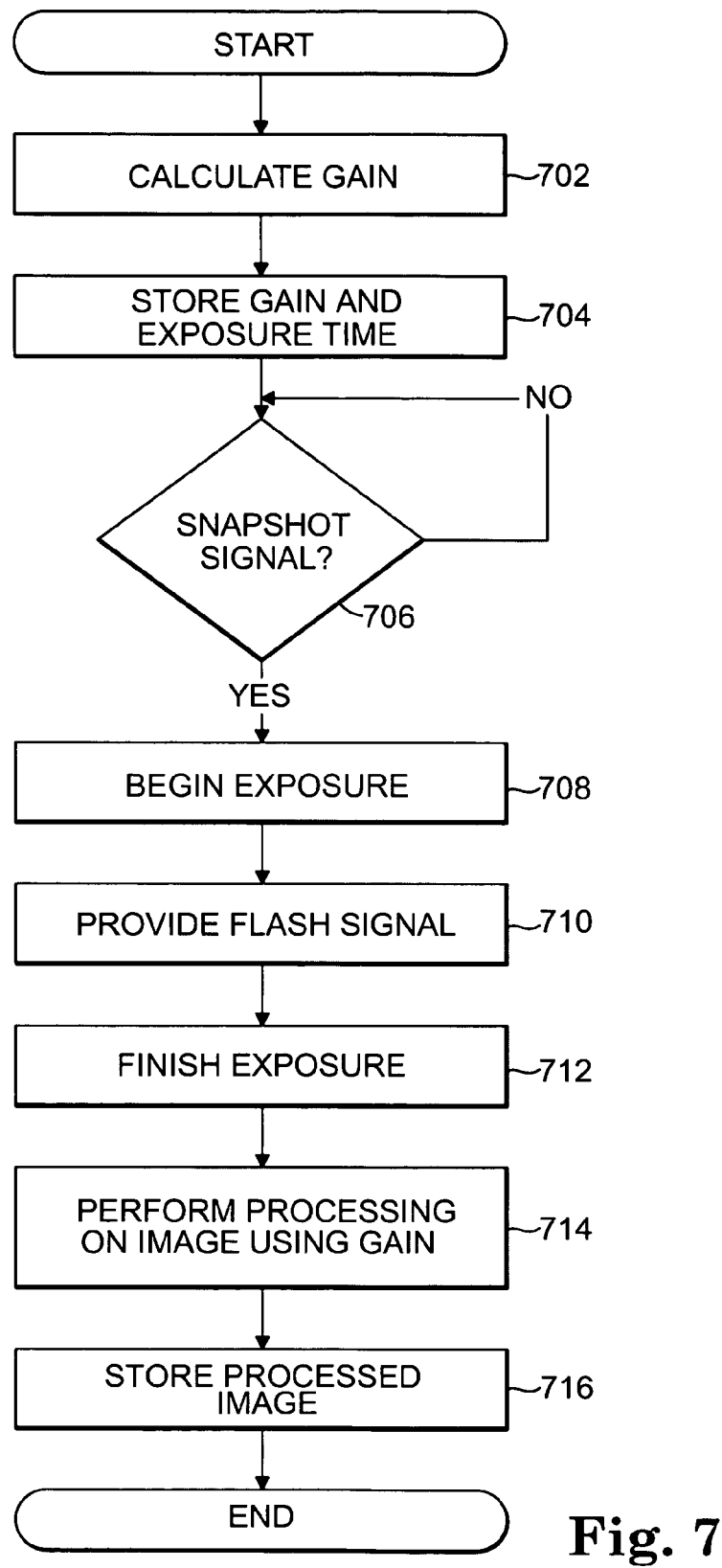
FIG. 7 is a flow chart illustrating a second embodiment of a method for capturing an image in a snapshot mode of operation.

FIGS. 7 and 8 illustrate an embodiment of system 100 in the snapshot mode of operation where flash device 114 is a xenon flash device and image sensor array 128 operates as a rolling shutter. FIG. 7 is a flow chart illustrating a second embodiment of a method for capturing an image in a snapshot mode of operation. FIG. 8 is a timing diagram 800 illustrating a second example of signals used to capture an image in a snapshot mode of operation.

In snapshot mode, host 110 determines whether a flash is desired by analyzing the one or more images received from camera module 112 during viewfinder mode. In response to determining that a flash is desired, host 110 accesses the flash enable/flash type register 200 to enable flash device 114. Host 110 also detects that the flash type of flash device 114 is a xenon flash device. Camera module 112 provides a flash signal to the xenon flash device to cause the flash to be fired. With a xenon flash device, all of the flash energy is discharged in a relatively short time period.

Referring to FIG. 7, a snapshot gain, $G_S$, is calculated as indicated in a block 702. The snapshot gain is derived as follows. For proper exposure, the exposure-gain product times the illumination in snapshot mode is set equal to the exposure-gain product times the illumination in viewfinder mode as shown in equation [11].

$$E_V \cdot G_V \cdot I_V = E_S \cdot G_S \cdot I_S \quad [11]$$

In equation [12], the exposure-gain product times the illumination in viewfinder mode is equal to the sum of the product of the exposure time of the flash, $E_F$, the snapshot gain, $G_S$, and the flash illumination, $I_F$, and the product of the snapshot exposure time, $E_S$, the snapshot gain, $G_S$, and the viewfinder illumination, $I_V$. On the right side of the equation, the first product ($E_F$, $G_S$, and $I_F$) represents the amount of light added by flash device 114 and the second product ($E_S$, $G_S$, and $I_V$) represents the amount of light present in viewfinder mode.

$$E_V \cdot G_V \cdot I_V = E_F \cdot G_S \cdot I_F + E_S \cdot G_S \cdot I_V \quad [12]$$

$G_S$ is solved for in equation [12] to get equation [13].

$$G_S = \frac{E_V \cdot G_V \cdot I_V}{E_F \cdot I_F + E_S \cdot I_V} \quad [13]$$

To remove the ($E_F \cdot I_F$) term in the denominator of equation [13], equation [14] is used.

$$E_F \cdot G_F \cdot I_F = E_V \cdot G_V \cdot I_V \quad [14]$$

The ($E_F \cdot I_F$) term of equation [14] is solved for to get equation [15].

$$E_F \cdot I_F = \frac{E_V \cdot G_V}{G_F} \cdot I_V \quad [15]$$

The $$\left( \frac{E_V \cdot G_V}{G_F} \cdot I_V \right)$$

term is substituted into equation [13] for the ($E_F \cdot I_F$) term to get equation [16].

$$G_S = \frac{E_V \cdot G_V \cdot I_V}{\frac{E_V \cdot G_V}{G_F} \cdot I_V + E_S \cdot I_V} \quad [16]$$

The viewfinder illumination, $I_V$, on the right side of equation [16] cancels to get equation [17].

$$G_S = \frac{E_V \cdot G_V}{\frac{E_V \cdot G_V}{G_F} + E_S} \quad [17]$$

An auto exposure function in host 110 measures EGPv, i.e., $E_V \cdot G_V$, during viewfinder mode. The snapshot exposure time, $E_S$, is programmed by a user of system 100 and is set to be slightly longer than the frame time of image sensor array 128. The flash gain, $G_F$, is also programmed by a user of system 100 according to the flash gain of the xenon flash device. Accordingly, host 110 calculates the snapshot gain using equation [17].

The snapshot gain, $G_S$, and exposure time, $E_S$, are stored in registers 124 as indicated by a block 704. A determination is made as to whether a snapshot signal has been received from host 110 by camera module 112 as indicated by a block 706. If a snapshot signal has not been received, then the determination of block 706 is made again at a later time. If a snapshot signal has been received, then an exposure is begun to capture an image using image sensor array 128 as indicated by a block 708. A flash signal is provided to flash device 114 to cause the xenon flash to be fired as indicated by a block 710. The exposure is finished according to the exposure time as indicated by a block 712. Processing is performed on the image by gain amplifier 130 using the gain as indicated by a block 714. The processed image is stored in memory 120 on host 110 as indicated by a block 716.

FIG. 8 illustrates the operation of snapshot mode with a xenon flash device. Timing diagram 800 illustrates a snapshot signal 802, a first row exposure signal 804, a last row exposure signal 806, a xenon flash trigger signal 808, and a data out signal 810.

At a time t1, host 110 provides a snapshot signal to camera module 112. At a time t2, the first row of image sensor array 128 begins exposing, and at time t3, the last row of image sensor array 128 begins exposing. Thus, the frame time in FIG. 8 is the amount of time between t2 and t3. The xenon flash is fired at time t4 in response to a flash signal from camera module 112. With a xenon flash, the flash signal comprises a pulse with a relatively short duration. The first row of image sensor array 128 finishes exposing at time t5. At time t5, data output from image sensor array 128 to gain amplifier 130 begins and continues until time t6 when the last row of image sensor array 128 finishes exposing.

Figure 9:
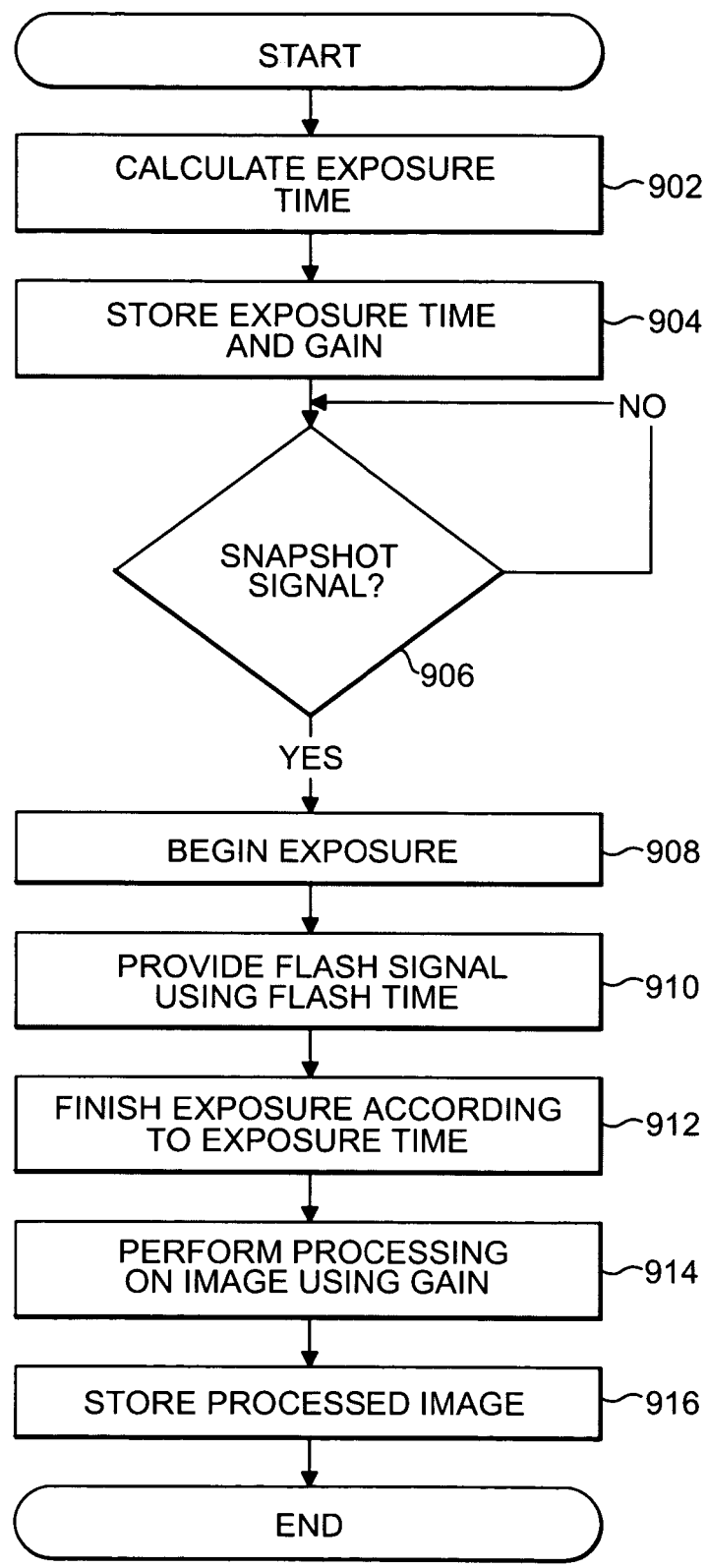
FIG. 9 is a flow chart illustrating a third embodiment of a method for capturing an image in a snapshot mode of operation.
Figure 10:
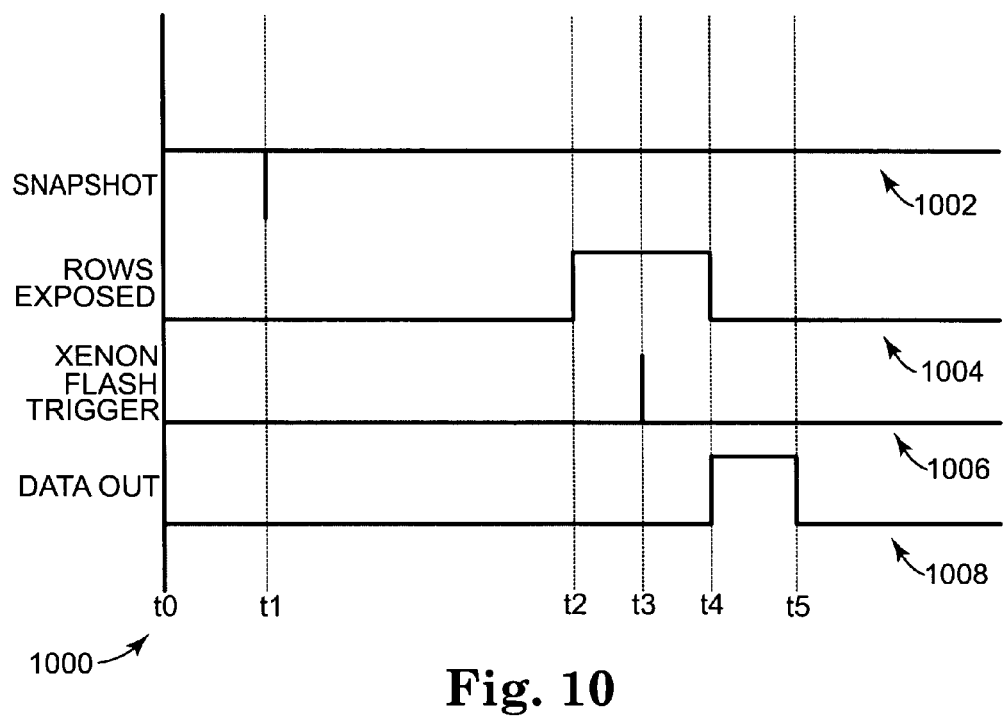
FIG. 10 is a timing diagram illustrating a third example of signals used to capture an image in a snapshot mode of operation.

FIGS. 9 and 10 illustrate an embodiment of system 100 in the snapshot mode of operation where flash device 114 is a xenon flash device and image sensor array 128 operates as a fixed, i.e., non-rolling, shutter. With a fixed or non-rolling shutter, all rows of image sensor array 128 are exposed simultaneously. FIG. 9 is a third embodiment of a method for capturing an image in a snapshot mode of operation. FIG. 10 is a timing diagram 1000 illustrating a third example of signals used to capture an image in a snapshot mode of operation.

In snapshot mode, host 110 determines whether a flash is desired by analyzing the one or more images received from camera module 112 during viewfinder mode. In response to determining that a flash is desired, host 110 accesses the flash enable/flash type register 200 to enable flash device 114. Host 110 also detects that the flash type of flash device 114 is a xenon flash device. Camera module 112 provides a flash signal to the xenon flash device to cause the flash to be fired. With a xenon flash device, all of the flash energy is discharged in a relatively short time period.

Referring to FIG. 9, a snapshot exposure time, Es, is calculated as indicated in a block 902. The snapshot exposure time is derived as follows. For proper exposure, the exposure-gain product times the illumination in snapshot mode is set equal to the exposure-gain product times the illumination in viewfinder mode as shown in equation [18].

$$E_V \cdot G_V \cdot I_V = E_S \cdot G_S \cdot I_S \quad [18]$$

In equation [19], the exposure-gain product times the illumination in viewfinder mode is equal to the sum of the product of the exposure time of the flash, $E_F$, the snapshot gain, $G_S$, and the flash illumination, $I_F$, and the product of the snapshot exposure time, $E_S$, the snapshot gain, $G_S$, and the viewfinder illumination, $I_V$. On the right side of the equation, the first product ($E_F$, $G_S$, and $I_F$) represents the amount of light added by flash device 114 and the second product ($E_S$, $G_S$, and $I_V$) represents the amount of light present in viewfinder mode.

$$E_V \cdot G_V \cdot I_V = E_F \cdot G_S \cdot I_F + E_S \cdot G_S \cdot I_V \quad [19]$$

To remove the flash illumination, $I_F$, from equation [19], equation [20] is used.

$$E_F \cdot G_F \cdot I_F = E_V \cdot G_V \cdot I_V \quad [20]$$

The flash illumination, $I_F$, is solved for in equation [20] to get equation [21].

$$I_F = \frac{E_V \cdot G_V \cdot I_V}{E_F \cdot G_F} \quad [21]$$

The $$\left( \frac{E_V \cdot G_V \cdot I_V}{E_F \cdot G_F} \right)$$

term from equation [21] is substituted into equation [19] for Iv to get equation [22].

$$E_V \cdot G_V \cdot I_V = E_F \cdot G_S \cdot \frac{E_V \cdot G_V \cdot I_V}{E_F \cdot G_F} + E_S \cdot G_S \cdot I_V \quad [22]$$

The viewfinder illumination, Iv, on both sides of equation [22] cancels and the flash exposure time, $E_F$, on the right side of equation [22] cancels to get equation [23].

$$E_V \cdot G_V = E_V \cdot G_V \cdot \frac{G_S}{G_F} + E_S \cdot G_S \quad [23]$$

The snapshot exposure time, Es, is solved for in equation [23] to get equation [24].

$$E_S = \frac{E_V \cdot G_V}{G_S} - \frac{E_V \cdot G_V}{G_F} \quad [24]$$

The terms of equation [24] are rearranged to get equation [25].

$$E_S = E_V \cdot G_V \left( \frac{G_F - G_S}{G_F \cdot G_S} \right) \quad [25]$$

An auto exposure function in host 110 measures EGPv, i.e., Ev·Gv, during viewfinder mode. The snapshot gain, Gs, is programmed by a user of system 100. The flash gain, Gf, is programmed by a user of system 100 according to the flash gain of the xenon flash device. Accordingly, host 110 calculates the snapshot gain using equation [25].

The snapshot gain, Gs, and exposure time, Es, are stored in registers 124 as indicated by a block 904. A determination is made as to whether a snapshot signal has been received from host 110 by camera module 112 as indicated by a block 906. If a snapshot signal has not been received, then the determination of block 906 is made again at a later time. If a snapshot signal has been received, then an exposure is begun to capture an image using image sensor array 128 as indicated by a block 908. A flash signal is provided to flash device 114 to cause the xenon flash to be fired as indicated by a block 910. The exposure is finished according to the exposure time as indicated by a block 912. Processing is performed on the image by gain amplifier 130 using the gain as indicated by a block 914. The processed image is stored in memory 120 on host 110 as indicated by a block 916.

FIG. 10 illustrates the operation of snapshot mode with a xenon flash device. Timing diagram 1000 illustrates a snapshot signal 1002, a rows exposed signal 1004, a xenon flash trigger signal 1006, and a data out signal 1008.

At a time t1, host 110 provides a snapshot signal to camera module 112. At a time t2, all rows of image sensor array 128 begin exposing. The xenon flash is fired at time t3 in response to a flash signal from camera module 112. With a xenon flash, the flash signal comprises a pulse with a relatively short duration. The rows of image sensor array 128 finish exposing at time t4. At time t4, data output from image sensor array 128 to gain amplifier 130 begins and continues until time t5 when all of the row data has been output.

Figure 11:
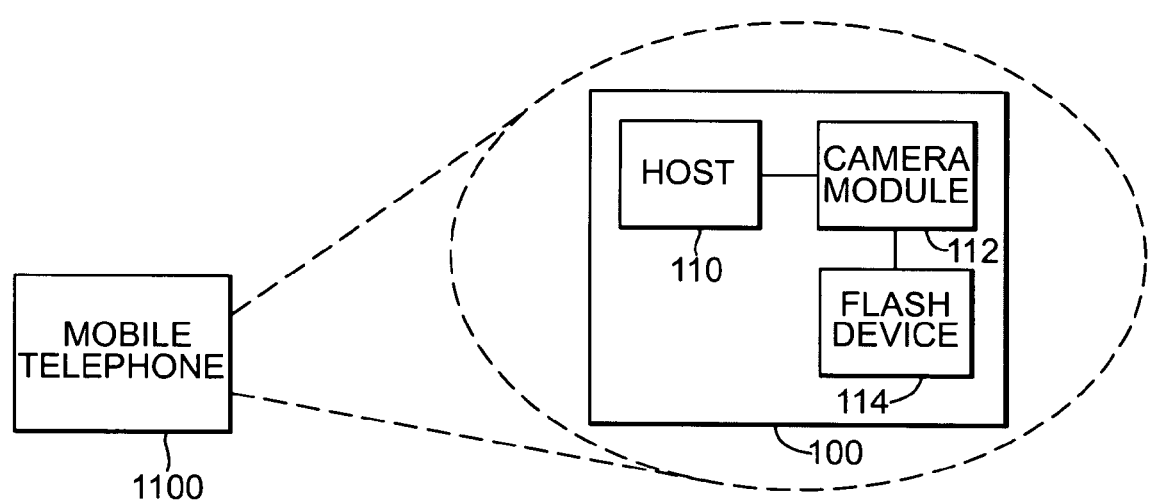
FIG. 11 is a block diagram illustrating an embodiment of a system that comprises the embodiment of FIG. 1.

FIG. 11 is a block diagram illustrating an embodiment of a mobile telephone 1100 that comprises the embodiment of FIG. 1. Mobile telephone 1100 comprises system 100 as shown in FIG. 1. Mobile telephone 1100 is configured to allow a user to place and receive telephone calls and other voice and data transmissions using a wireless network.

Mobile telephone 1100 illustrates one embodiment of a system that includes system 100. In other embodiments, system 100 may be included in other types of portable devices such as personal digital assistants (PDAs), laptop computer systems, handheld electronic devices, or other portable processing systems. System 100 may also be included in other types of non-portable devices such as desktop computer systems, video game machines, or other non-portable processing systems.

Figure 12:
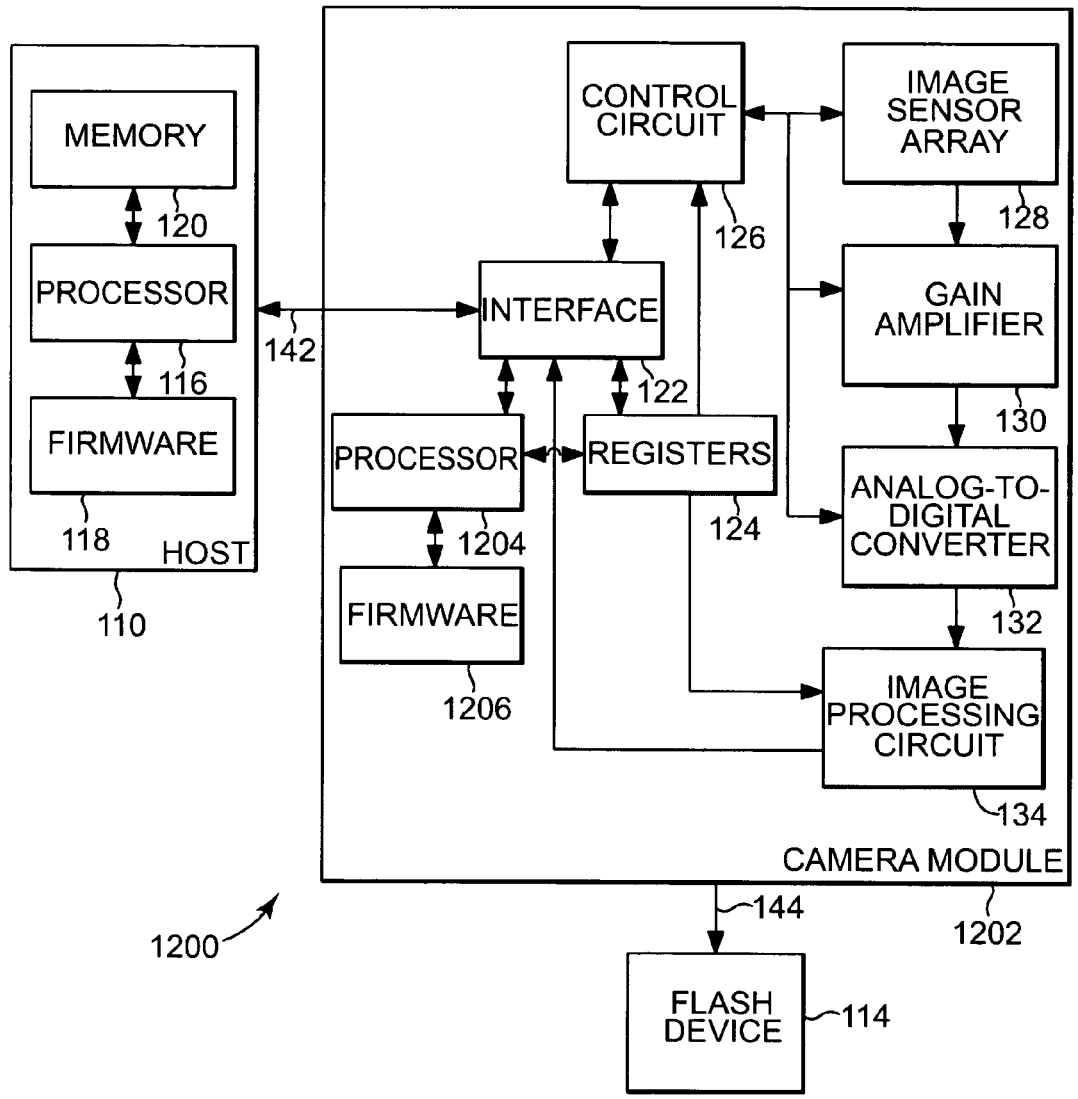
FIG. 12 is a block diagram illustrating an alternative embodiment of the system of FIG. 1.

FIG. 12 is a block diagram illustrating an alternative embodiment of the system of FIG. 1. In FIG. 12, system 1200 is configured to perform the same functions of system 100 described above. System 1200 comprises host 110, a camera module 1202, and flash device 114. Camera module 1202 comprises interface 122, registers 124, control circuit 126, image sensor array 128, gain amplifier 130, analog-to-digital converter 132, image processing circuit 134, a processor 1204, and firmware 1206.

In the embodiment of FIG. 12, camera module 1202 performs many of the functions described above in FIGS. 5, 7, and 9 with respect to host 110 using processor 1204 and firmware 1206. In particular, processor 1204 and firmware 1206 generate parameters used in the viewfinder and snapshot modes of operation of camera module 1202. These parameters include exposure time, gain, and white balance coefficients. System 1200 may be used in place of system 100 in system 1100 shown in FIG. 11.

The embodiments described above used various combinations of hardware and software components to implement the features described above. In other embodiments, other combinations of hardware and software components may be used.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A camera module comprising:
    an image sensor array;
    a gain amplifier;
    an indicator set to indicate whether a first flash device or a second flash device is present; and
    a plurality of storage locations;
    wherein the plurality of storage locations is configured to store an exposure time and a gain, wherein the exposure time and the gain are associated with the first flash device in response to the indicator indicating the presence of the first flash device, wherein the exposure time and the gain are associated with the second flash device in response to the indicator indicating the presence of the second flash device, wherein the image sensor array is configured to capture an image using the exposure time, and wherein the gain amplifier is configured to perform processing on the image using the gain.

2. The camera module of claim 1 wherein the first flash device comprises an LED flash device, and wherein the second flash device comprises a xenon flash device.

3. The camera module of claim 2 wherein the exposure time is calculated using a flash time in response to the indicator indicating the presence of the LED flash device.

4. The camera module of claim 2 wherein the plurality of storage locations are configured to store a plurality of white balance coefficients in response to the indicator indicating the presence of the LED flash device.

5. The camera module of claim 2 wherein the gain is calculated using an exposure time in response to the indicator indicating the presence of the xenon flash device.

6. The camera module of claim 1 further comprising:
    a control circuit;
    wherein the control circuit is configured to generate a flash signal in accordance with the indicator, wherein the control circuit is configured to provide the flash signal to the first flash device in response to the indicator indicating the presence of the first flash device, and wherein the control circuit is configured to provide the flash signal to the second flash device in response to the indicator indicating the presence of the second flash device.

7. The camera module of claim 6 wherein the flash signal has a first duration in response to the indicator indicating the presence of the first flash device, and wherein the flash signal has a second duration in response to the indicator indicating the presence of the second flash device.

8. The camera module of claim 1 further comprising:
    a processor; and
    firmware executable by the processor;
    wherein the firmware is configured to cause the processor to generate the exposure time and the gain in accordance with the indicator, and wherein the firmware is configured to cause the processor to store the exposure time and the gain in the plurality of storage locations.

9. The camera module of claim 1 wherein the exposure time is greater than a frame time of the image sensor array.

10. The camera module of claim 1 wherein the exposure time is less than or equal to a frame time of the image sensor array.

11. The camera module of claim 1 wherein the plurality of storage locations comprises at least a first register and a second register.

12. A system comprising:
    a camera module comprising an image sensor array, a gain amplifier, and an indicator;
    a flash device coupled to the camera module;
    a processor coupled to the camera module; and
    firmware executable by the processor;
    wherein the firmware is executable by the processor to cause the indicator to be accessed to determine a type of the flash device, wherein the firmware is executable by the processor to cause an exposure time and a gain associated with the type of the flash device to be provided to the camera module, wherein in response to the camera module receiving a snapshot signal:

the image sensor array is configured to capture an image using the exposure time, the camera module is configured to provide a flash signal to the flash device, and the gain amplifier is configured to amplify image data associated with the image using the gain.

13. The system of claim 12 further comprising:
a host comprising the processor and the firmware;
wherein the firmware is executable by the processor to cause the host to provide the snapshot signal to the camera module.

14. The system of claim 12 further comprising:
a host coupled to the camera module and configured to provide the snapshot signal to the camera module;
wherein the camera module comprises the processor and the firmware.

15. The system of claim 12 wherein the flash device comprises an LED flash device.

16. The system of claim 15 wherein the firmware is executable by the processor to cause the exposure time to be calculated using the gain.

17. The system of claim 15 wherein the firmware is executable by the processor to cause a flash time to be calculated using the gain, wherein the firmware is executable by the processor to cause the flash time to be provided to the camera module, and wherein the camera module is configured to provide the flash signal to the flash device for a duration associated with the flash time.

18. The system of claim 15 further comprising:
an image processing circuit;
wherein the firmware is executable by the processor to cause at least one white balance coefficient to be provided to the camera module, and wherein the image processing circuit is configured to perform processing on the image data using the at least one white balance coefficient.

19. The system of claim 12 wherein the flash device comprises a xenon flash device.

20. The system of claim 19 wherein the firmware is executable by the processor to cause the gain to be calculated using the exposure time.

21. The system of claim 19 wherein the image sensor array is operated as a rolling shutter.

22. The system of claim 19 wherein the image sensor array is operated as a non-rolling shutter.

23. A method of operating a camera module coupled to an LED flash device, the camera module comprising an image sensor array configured to operate as a rolling shutter, comprising:

calculating an exposure time using a gain;
providing the exposure time and the gain to the camera module; and
in response to receiving a snapshot signal:
capturing an image using the image sensor array in accordance with the exposure time;
providing a flash signal to the LED flash device; and
amplifying image data associated with the image in accordance with the gain.

24. The method of claim 23 further comprising:
calculating a flash time using the gain and an exposure-gain product calculated using an auto exposure function;
calculating the exposure time using the flash time; and
providing the flash time to the camera module.

25. The method of claim 23 further comprising:
calculating a plurality of white balance coefficients using interpolation;
providing plurality of white balance coefficients to the camera module; and
processing the image data using the plurality of white balance coefficients.

26. A method of operating a camera module coupled to a xenon flash device, the camera module comprising an image sensor array, comprising:

calculating a gain using an exposure time and an exposure-gain product associated with a viewfinder mode;
providing the gain and the exposure time to the camera module; and
in response to receiving a snapshot signal:
capturing a first image using the image sensor array in accordance with the exposure time;
providing a flash signal to the xenon flash device; and
amplifying image data associated with the image in accordance with the gain.

27. The method of claim 26 further comprising:
calculating the exposure gain product using an auto exposure function.

28. The method of claim 26 further comprising:
capturing the first image using the image sensor array in accordance with the exposure time by operating the image sensor array as a rolling shutter.

29. The method of claim 26 further comprising:
capturing the first image using the image sensor array in accordance with the exposure time by operating the image sensor array as a fixed shutter.

* * * * *